United States Patent [19]
Tanner et al.

[11] Patent Number: 5,795,377
[45] Date of Patent: Aug. 18, 1998

[54] METHOD FOR MODIFYING PAPERMAKING SLUDGE AND PRODUCTS MADE FROM MODIFIED PAPERMAKING SLUDGE

[75] Inventors: James Jay Tanner, Winneconne; David Henry Hollenberg, Kaukauna, both of Wis.

[73] Assignee: Kimberly-Clark Worldwide, Inc., Neenah, Wis.

[21] Appl. No.: 906,249

[22] Filed: Aug. 5, 1997

Related U.S. Application Data

[63] Continuation-in-part of Ser. No. 841,960, Apr. 8, 1997, abandoned.

[51] Int. Cl.$^6$ ............................. C08L 1/02; D21H 11/14; D21H 21/08
[52] U.S. Cl. ............................. 106/164.4; 106/164.5; 524/13; 524/14; 162/103; 162/158; 162/164.5; 162/164.6; 162/164.7; 162/181.4; 264/210.1
[58] Field of Search ............................. 106/164.4, 164.5; 524/13, 14; 162/103, 158, 164.5, 164.6, 164.7, 181.4; 264/210.1

[56] References Cited

U.S. PATENT DOCUMENTS

| | | | |
|---|---|---|---|
| 3,895,997 | 7/1975 | Haywood | 162/100 |
| 3,895,998 | 7/1975 | Haywood et al. | 162/100 |
| 4,256,491 | 3/1981 | Tate | 106/164.5 |
| 4,260,488 | 4/1981 | Condolios | 210/259 |
| 4,356,060 | 10/1982 | Neckermann et al. | 162/181.6 |
| 4,374,794 | 2/1983 | Kok | 264/122 |
| 4,421,599 | 12/1983 | Kuzuoka et al. | 162/100 |

OTHER PUBLICATIONS

Derwent World Patent Database abstract of DE 3842138: Description of P. Voelskow, "Simultaneous Processing of Dewatered Clarifier Sludge and Paper." (Jun. 1990).

Derwent World Patent Database abstract of JP 54-000031: Description of A. Inoue, "Lightweight, Flame Resistant Insulation Board Mfr." (Jan. 1979).

Derwent World Patent Database abstract of JP 54-007462: Description of Sanko Seishi KK, "Manufacturing Moudings From Paper Making Sludge." (Jan. 1979).

Derwent World Patent Database abstract of JP 60-171050: Description of Shine KK, "Utilisation of Sludge Formed In Paper Making." (Sep. 1985).

Klingenberg, Daniel J., Stefan Zauscher, and C. Tim Scott, "Pulp Extrusion at Ultra–High Consistencies: A New Processing Method for Recycling Wastepapers and Sludges." Final Report, (Feb. 3, 1997), pp. 1–40.

Primary Examiner—David Brunsman
Attorney, Agent, or Firm—Gregory E. Croft

[57] ABSTRACT

Papermaking sludge can be modified to a modeling clay-like consistency by the addition of one or more dispersing agents, such as polyacrylamide. The modified papermaking sludge can be formed into a number of useful products, such as paper sheets or extruded products.

21 Claims, 3 Drawing Sheets

METHOD FOR MODIFYING PAPERMAKING SLUDGE AND PRODUCTS MADE FROM MODIFIED PAPERMAKING SLUDGE

This application is a continuation-in-part of Ser. No. 08/841,960 filed Apr. 8, 1997 and entitled "METHOD FOR MODIFYING PAPER SLUDGE AND PRODUCTS MADE FROM MODIFIED PAPER SLUDGE" now abandoned.

BACKGROUND OF THE INVENTION

In the recycling of paper there is an interest in recovering and reusing as much of the materials contained in the paper as possible. Although a major constituent of most paper is wood fiber, in some types of paper there are other materials that are not generally recycled with the fiber. These materials end up being separated from the wood fiber and are ultimately discarded in the form of an aqueous suspension of solids. In this form these materials are generically termed "sludge" and are typically discarded at a cost to the recycling facility. While the composition of this sludge is variable, it generally consists of a mixture of wood pulp fibers and fines, and a combination of inorganic fillers that are used in some paper grades. These inorganic fillers are most often calcium carbonate and/or kaolin clays. It is possible that other clays can be present as well as amounts of titanium dioxide and other pigments and fillers and inks, but the major constituents are generally fiber/fines and the inorganic fillers calcium carbonate and clay.

Normally sludges from deinking operations are dewatered prior to disposal because it reduces the weight of material going to the landfill and reduces the charges for landfill disposal because these are typically based on weight. Since the majority of the weight in the sludge comes from water, it behooves the sludge processor to remove as much water as possible. The resulting material typically is a crumbly, not very cohesive material that appears to be dry. At thirty percent consistency, most sludges are more like dry solids as opposed to a suspension or dispersion. Because of the non-cohesive character of sludge, the materials handling equipment for moving, storing and transporting are generally the same as for dry materials.

The prior art sets forth basically five different approaches for utilizing the sludge as a product: (1) Pelletizing the sludge using high pressure and binders where the sludge is dried before pelletizing. The pellets can be used as absorbents or chemical carriers, e.g., fertilizer. Alternatively, large diameter pellets or cylinders are used as fuel. (2) Extracting the fibers or fillers from sludge in various ways to subsequently use the extracted material in a paper and/or ceramic product. These are both wet and dry processes. (3) Mixing the sludge with other construction ingredients such as concrete or plastic to embody the sludge as reinforcing fibers or filler. Again these are both wet and dry processes. (4) Direct molding of sludge into large shapes (i.e., large cross section) and drying. These products are construction blocks or boards and can be made using both wet and dry processes. Some of these can be fired to burn out the cellulosic and polymeric materials leaving a ceramic product. (5) Some sludges are formed into particulates or briquettes of various forms and sizes. These are subsequently carbonized to make an activated carbon product.

While considerable prior art exists with regard to methods for handling, utilizing or recycling of sludge as outlined above, in actual fact there has been little commercial implementation. The majority of the materials classed as sludge from both deinking operations as well as conventional pulp and paper mills end up in landfills or are discarded or disposed of in some other way. The major reason is that few of the many procedures available to convert sludges can produce products that have significant value.

However, there are continuing trends indicating there is a need to develop methods and processes that would use these waste materials. It is likely that environmental and regulatory pressures to recycle paper and paper products will increase. This will mean there will be more deinking and recycling operations in the future. In addition, it is likely that the percentage of inorganic materials in recycled paper, such as calcium carbonate and clay, will increase for a number of reasons. For example, calcium carbonate improves the long term stability of printing papers because the alkalinity of the calcium carbonate reduces the rate of discoloration and embrittlement of the paper. Additionally, both calcium carbonate and clay are used to increase the opacity of paper. In printing such things as magazines or advertising supplements, addition of inorganic materials allows for reductions in the amount of fiber used for the paper. The purpose for the added inorganic material is to provide superior opacity. In addition to the improved opacity, incorporation of clay as a coating or filler and calcium carbonate as a filler also provides improvements to the surface of the paper such that the quality of the printing is improved. Furthermore, wood pulp, even though it is a renewable resource, is becoming more expensive. The cost of wood pulp currently exceeds the cost of calcium carbonate or clay, and it therefore makes economic sense to include considerable amounts of these fillers in paper.

All of these trends act together to provide increases in the amounts of waste materials in the form of sludge that will be generated in the future. Therefore there is a need for a commercially feasible method of utilizing papermaking sludge.

SUMMARY OF THE INVENTION

It has now been discovered that the rheological properties of sludge from papermaking and/or paper recycling can be altered and controlled when mixed with a small amount of dispersant (hereinafter defined). The cellulose fibers, cellulose fines, clays and fillers normally present in papermaking sludge have been agglomerated by the use of flocculants and dewatering polymers in the water treatment process that leads to the generation of papermaking sludge in a tissue mill. Whereas papermaking sludge typically has a dry, crumbly texture even though it contains large amounts of water, the modified papermaking sludge of this invention has a consistency, appearance and feel (rheology) closely resembling modeling clay. As such, the modified sludge of this invention can be formed into a very thin cross section which has integrity and uniformity. This can be done by injection molding or profile or sheet extrusion in a manner similar to that used to form polymer or food products. Therefore, as a result of this invention, papermaking sludge can be modified and thereafter converted to a useful form of paper or other molded or extruded products.

While not being bound to any theory, it is believed that the addition of the dispersant to the papermaking sludge acts as a deflocculant and effectively reverses the agglomeration of the cellulose fibers, fines, clays and fillers which took place in the tissue mill. This desired reversal is not easily accomplished and is made more difficult by the minimal water level present in the papermaking sludge when deflocculation is initiated, therefore requiring high shear and mixing. The initial distribution of water and particles is non uniform and the papermaking sludge is crumbly. After adding the dispersant and initial mixing of the crumbs, the loose agglomerates begin to grow. The water and colloidal particles begin to redistribute and fill the interstices between the particles and to coat the exterior surfaces of crumbs with water films. The crumbs grow by interaction and accretion and are increasingly worked or plastically deformed by the mixer. The indicated viscosity rises irregularly. As interstices continue to be filled, developing some interparticle lubricity, the growing crumbs are gradually consolidated and there is increasing interchange among them by shear and tearing. Large clumps form in the mixer that have a plastic character that exhibits a rather uniform viscosity within the clump. The exterior surface condition of the large clumps allow them to be brought together where they readily cohere into larger clumps.

Mixing, particle coating and deflocculation are most efficient when the shear forces exerted on the mix are highest. The desired condition to allow forming into a paper-like sheet is an empirical fine tuning between an insufficiently plastic mix which will tear or delaminate on passing through a die and a too compliant or incohesive mixture which will slump and not retain the extruded shape. The quantity of dispersant added, moisture level of the sludge and mixing intensity/time and temperature are the controllable variables to obtain the fine tuning of the rheological properties.

Hence in one aspect, the invention resides in a method of modifying papermaking sludge comprising adding from about 0.5 to about 20 dry weight percent of a dispersant to the papermaking sludge and mixing the dispersant and the papermaking sludge until the rheology of the mixture is substantially the same as that of modeling clay. The modified sludge, like modeling clay, exhibits changing rheological properties with temperature and liquid addition. Accordingly, as used herein, a rheology which is substantially the same as that of modeling clay is a rheology substantially the same as that of Roma Plastilina Grade No. 1 gray/green modeling clay, commercially available from Sculpture House, 38 East 30th Street, New York, N.Y., held at a temperature from 65° to 85°. When the papermaking sludge mixture behaves like modeling clay within this temperature range, it can be further processed into other products as described herein.

In another aspect, the invention resides in a modified papermaking sludge comprising from about 0.5 to about 20 dry weight percent of a dispersant, said modified sludge having a tensile strength (maximum stress at failure) of about 5 kilopascals or greater, more specifically about 10 kilopascals or greater, still more specifically from about 5 to about 70 kilospascals, and still more specifically from about 10 to about 35 kilopascals. In addition, the modified sludge of this invention can also have a strain at failure of about 0.02 or greater millimeter per millimeter, more specifically about 0.03 or greater millimeter per millimeter, and still more specifically from about 0.02 to about 0.1 millimeter per millimeter. By way of comparison, a typical papermaking sludge has an estimated maximum stress at failure of only about 0.88 kilopascals. The tensile test method and apparatus used to measure the tensile strength and strain are described in connection with FIGS. 5 and 6 herein.

The amount of dispersant added to the sludge can be from about 0.5 to about 20 weight percent or greater, more specifically from about 1 to about 12 weight percent, and still more specifically from about 2 to about 8 weight percent.

In another aspect, the invention resides in a method of making a paper sheet comprising: (a) combining papermaking sludge with a dispersant; (b) mixing the papermaking sludge and the dispersant; (c) forming the mixture into a sheet, such as by extruding and rolling the extruded material; and (d) drying the sheet.

In this aspect, the extrusion of the mixture and rolling the extrudate can be achieved using conventional extrusion and rolling equipment where the mass of malleable material is extruded into a uniform size continuous strand, ribbon or thick sheet. The extrudate is passed through a nip or series of nips to further extrude it into a thin sheet. In some instances it may be necessary to have the extrudate carried on a conveyor because of the very low tensile strength in the thin, wet condition.

The drying can be accomplished by using can dryers and passing the extruded sheet over the circumference of a series of heated rotating cans to vaporize the water. Drying of the sheet can be accelerated by impinging the sheet with high velocity hot air. Considerable shrinkage will occur during the drying and a calendering of the sheet may be needed to create a smooth sheet. The rate of water removal will be a function of the thickness of the sheet, the drying temperature and the adjacent air turbulence. Because of the unique form and composition of this production, other drying methods that would not be efficient for conventional paper, such as microwave drying, might find efficient application in the drying of products of the present invention.

In another aspect, the invention resides in a modified sludge composition comprising from about 5 to about 60 weight percent cellulose fibers and fiber fragments (fines), from about 10 to about 50 weight percent inorganic material such as calcium carbonate and clays, from about 0.5 to about 20 weight percent dispersant, and from about 30 to about 70 weight percent water.

In another aspect, the invention resides in a dry (air dry) paper sheet comprising from about 5 to about 30 weight percent cellulose fibers of traditional papermaking length (greater than 1.0 millimeter), from about 1 to about 10 weight percent cellulose fiber fragments, from about 5 to about 30 weight percent calcium carbonate, from about 5 to about 30 weight percent clay, and from about 1 to about 30 weight percent dispersant.

The dry paper sheet of this invention is much weaker in tensile strength for comparable basis weight than conventional papers due to the absence of significantly high quantities of long cellulosic fibers. It also has lower stretch properties than normal paper stocks such as writing or copier paper. However the tensile properties are not directional. The sludge paper surface is very tightly bonded and any inorganic materials are not free to shake loose. It readily accepts ink and provides a sharp edge to an ink line, which is needed for direct printing of complex graphics on paper or board stock. The paper does not readily redisperse in water from its dry state. It is more brittle and less porous than conventional paper. The density is higher than typical paper and the bulk is lower. The paper sheets of this invention can substitute for light or heavyweight printing papers, newsprint, linerboard, corrugating medium, S2S, clay coated board such as carton board and packaging materials. The paper sheet value exceeds the costs of processing and alternative disposal.

With regard to the composition of the papermaking sludge, there is an organic portion, an inorganic portion and water. The amount of water in the sludge can be from about 30 to about 70 weight percent, more specifically from about 40 to about 60 weight percent.

The organic portion of the papermaking sludge comprises cellulose fibers and fines and can be from about 5 to about 40 weight percent, more specifically from about 10 to about 35 weight percent, and still more specifically from about 15 to about 30 weight percent of the papermaking sludge. From about 10 to about 70 weight percent of the organic portion can be fiber fragments or fines. From about 30 to about 90 weight percent can be whole fibers or fibers having an average length of about 1 millimeter or greater.

The inorganic portion of the papermaking sludge can be from about 10 to about 65 weight percent, more specifically from about 30 to about 50 weight percent. From about 10 to about 90 weight percent, more specifically from about 20 to about 80 weight percent, and still more specifically from about 40 to about 60 weight percent of the inorganic portion can be calcium carbonate. From about 10 to about 90 weight percent, more specifically from about 20 to about 80 weight percent, and still more specifically from about 40 to about 60 weight percent of the inorganic portion can be clay. Suitable clay materials include kaolin clay or any sedimentary clay of colloidal size that is iron-free and has an $Al_2O_3$: $SiO_2$ mole ratio of about 1:2; e.g. Dickite, Halloysite and Nacrite.

As used herein, a "dispersant" is a material that helps maintain fine solid particles in a state of suspension and inhibit their agglomeration or settling in a fluid medium. With the help of mechanical agitation, dispersants can also break up agglomerates of particles to form particle suspensions. Overall, dispersants are useful in preventing settling, deposition, precipitation, agglomeration, flocculation, coagulation, adherence or caking of solid particles in a fluid medium. Suitable dispersants include: organic polyelectrolytes including polycarboxylates, polysulfonates, polysulfates and polyphosphates; inorganic sulfonates, polyphosphates and silicates; and polymers containing polar groups such as polyacrylamides and polyols.

Exemplary of suitable synthetic polymer dispersants are the co-polymers of ethylenically unsaturated monomers with mono-ethylenically unsaturated carboxylic acids or their partially neutralized salts. Examples of the preferred, $\alpha,\beta$-monounsaturated carboxylic acids include acrylic acid, methacrylic acid, maleic acid, maleic anhydride, itaconic acid, itaconic anhydride, fumaric acid, half esters or half amides of maleic, fumaric and itaconic acid, crotonic acids, alkyl acrylates and methacrylates containing 1–18 carbon alkyl groups, vinyl esters, vinyl aromatic compounds, dienes, etc. Homopolymers of monethylenically unsaturated carboxylic acids or mixtures of these monomers may also be used. Examples include acrylic acid and methacrylic acid homopolymers and acrylic acid/methacrylic acid copolymers. Examples of polyacrylamides of use include polyacrylamides and polymethracrylamides and their N and N,N dialkyl derivatives containing 1–18 carbon alkyl groups.

Exemplary of the sulfonic acid containing polymer dispersants are the homopolymers of monoethylenically unsaturated sulfonic acids (or salts thereof) and copolymers thereof with the aforementioned ethylenically unsaturated monomers. Suitable sulfonated containing monomers include aromatic sulfonic acids (such as styrene sulfonic acids, 2-vinyl ethylbenzenesulfonic acid, 2-vinyl-3-bromobenzenesulfonic acid, 2-allylbenzenesulfonic acid, vinylphenyl methanesulfonic acid), heterocyclic sulfonic acids (such as 2-sulfo-4-vinyl-furane and 2-sulfo-5-allylfurane), and aliphatic sulfonic acids (such as ethylenesulfonic acid and 1-phenylethylene sulfonic acid). Other sulfonated polymers that have been found to be of value in bringing about changes in the rheology of the mixtures of interest include calcium lignosulfonates, formaldehyde modified napthalene sulfonates, sulfonated melamine-formaldehyde polymers and other sulfonated polymers.

Exemplary of natural polymers and their derivatives that have been found to be useful as dispersants in the present invention include the carboxylated, sulfonated and phosphated derivatives of cellulose and starch such as carboxymethyl cellulose and carboxymethyl starch and neutralized or partially neutralized salts thereof. Other water soluble derivatives of cellulose and starch such as the hydroxyethyl and ethoxylated celluloses and starches are also of use in the present invention. Carbohydrate based materials such as corn syrups, maltodextrins, as well as naturally occurring carbohydrates (alginic acids, carrageenen, and gums such as arabic, algin, agar, ghatti, karaya, acacia, xanthan and chemically modified derivatives thereof. Other carboxylated polymers have also been found to be of value in modifying the rheology of the clay-carbonate-wood pulp blends.

Finally, there are inorganic dispersants and rheology modifiers such as the condensed phosphates, and the silicates that are commonly used to disperse particulates in the water treatment and ceramics industries. These include tetrasodium pyrophosphate, sodium hexametaphosphate, and sodium silicate.

DETAILED DESCRIPTION OF THE DRAWING

Figure 1:
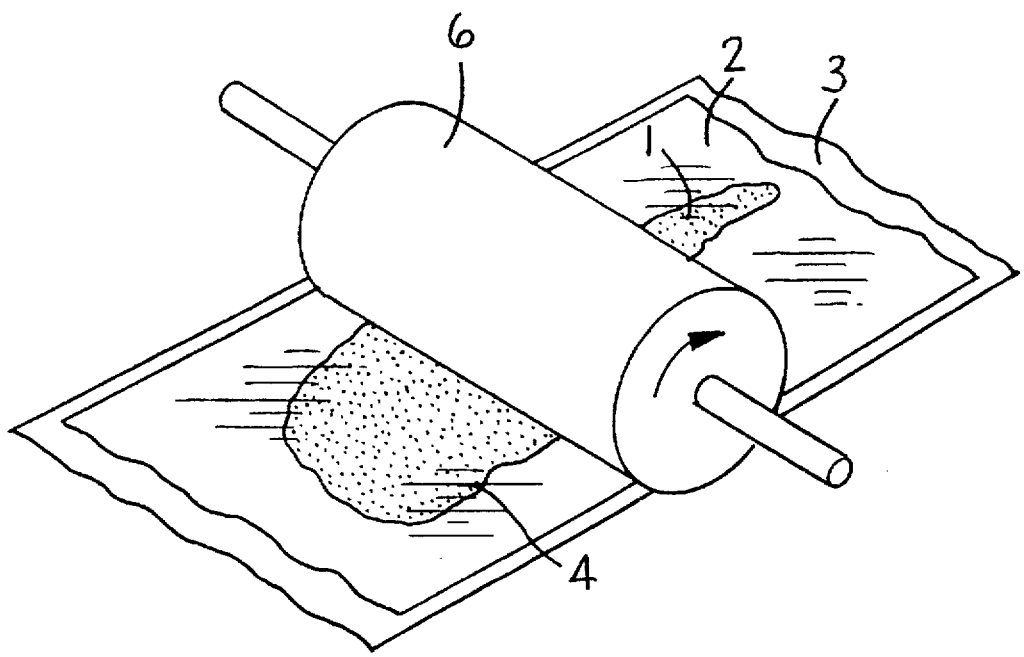
FIG. 1 is a schematic illustration of a method of making a sludge sheet using a roller.

FIG. 1 illustrates a method of rolling a quantity of sludge modified in accordance with this invention into a flat sheet. Shown is a quantity of hand rolled modified sludge 1 sandwiched between a top plastic sheet 2 and a bottom plastic sheet 3 supported on a flat surface (not shown). The modified sludge is flattened into a wet sheet 4 using a brass roll 6. This method is further described in connection with Example 1.

Figure 2:
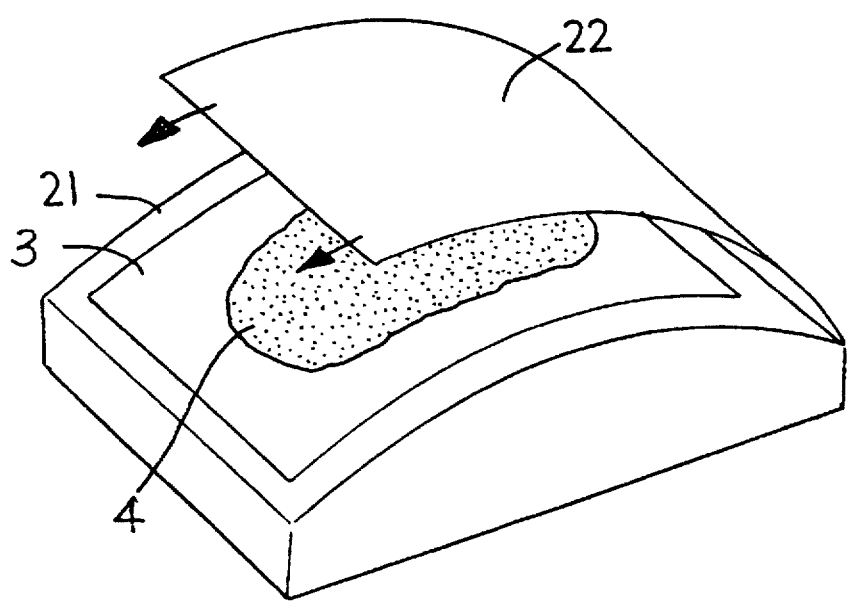
FIG. 2 is a schematic illustration of a laboratory method for drying a sludge sheet.

FIG. 2 illustrates an alternative method of drying a modified sludge sheet as more fully described in Example 2. Shown is a steam heated platen 21, a wet, flattened modified sludge sheet 4 such as that illustrated in FIG. 1, a bottom plastic sheet 3 and a canvas cover 22 which is adapted to overlay the modified sludge sheet and apply tension while the sheet is drying.

Figure 3:
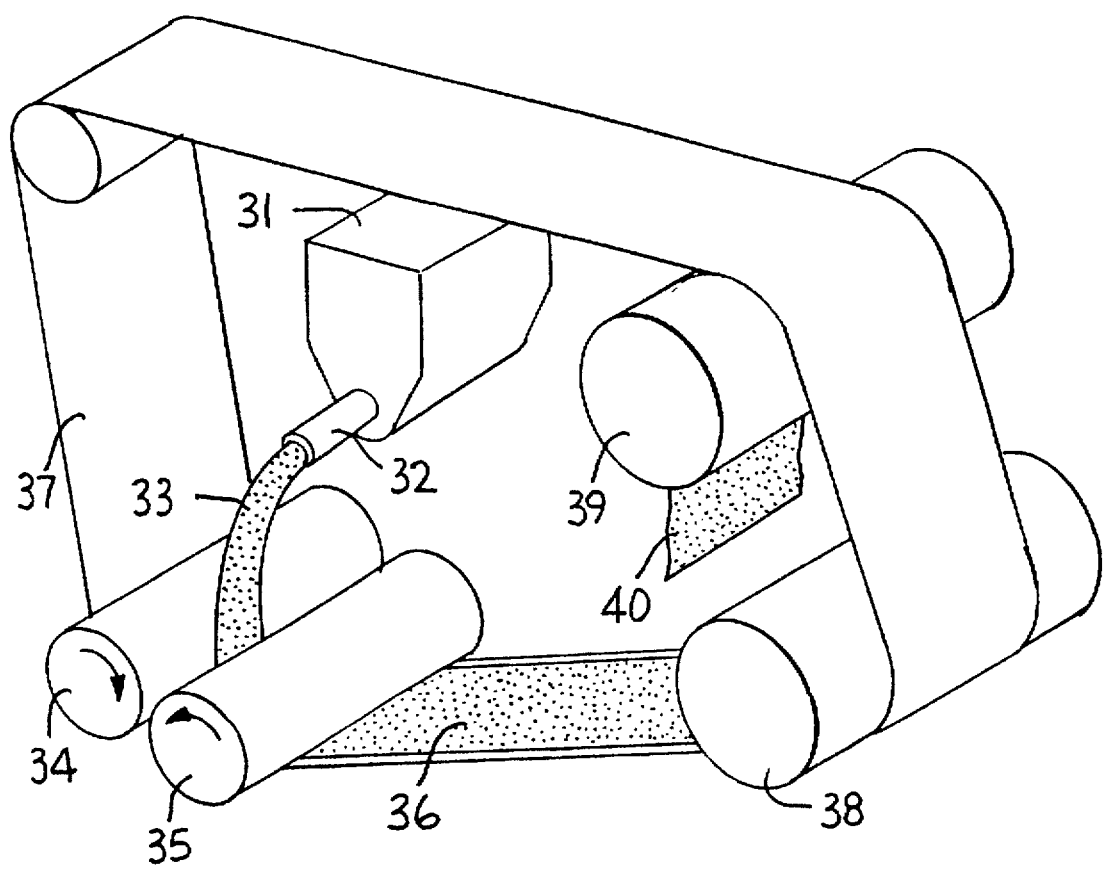
FIG. 3 is a schematic illustration of a continuous method of producing sludge paper.

FIG. 3 is a schematic illustration of a continuous method of making modified sludge sheets. Shown is a hopper/mixer 31 in which the sludge and dispersant are received and mixed, an extruder 32 which continuously feeds the mixture through a shaping die to produce the appropriate shaped extrudate 33, a pair of rollers 34 and 35 which provide a nip through which the extrudate passes and is flattened into a wet modified sludge sheet 36, a carrier and drying fabric 37 which supports the modified sludge sheet and carries it through the process, and drier rolls 38 and 39 which dry the modified sludge sheet to the desired moisture level, which is typically from about 1 to about 10 weight percent. The dried modified sludge sheet 40 is peeled away from the support fabric after the dryer roll 39.

Figure 4:
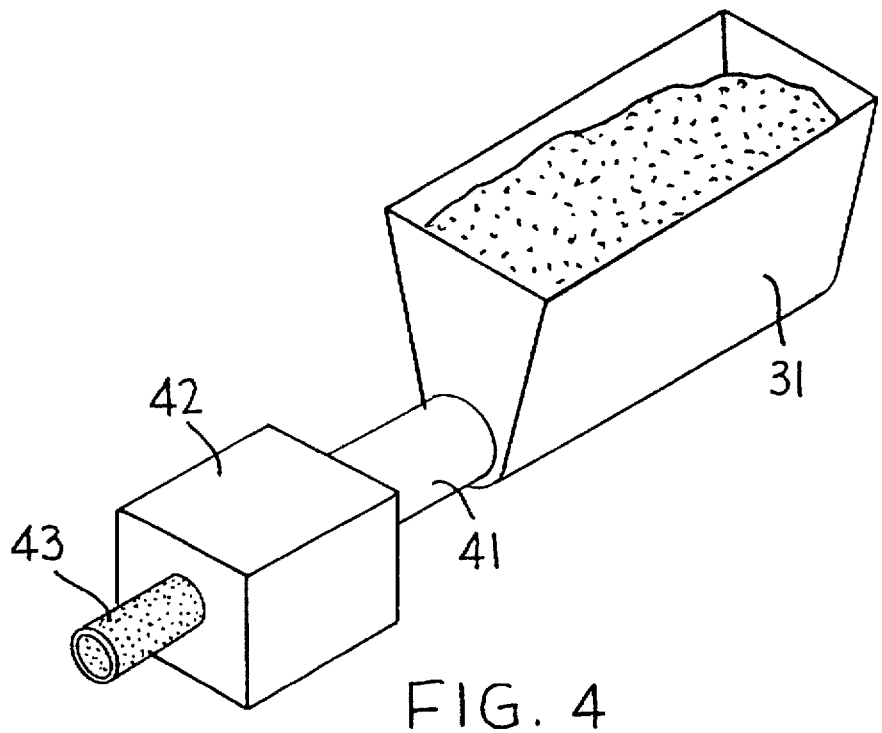
FIG. 4 is a schematic illustration of core profile extrusion of sludge.

FIG. 4 is a schematic illustration of an alternative method of making a sludge product, in which the sludge product is profile extruded into a desired shape such as the tube shape shown. Shown is the hopper/mixer 31, the extruder 41, the drying chamber 42, and the profile extrudate 43. Such a process is useful for making roll cores for bath tissue and towels, in which the dried tube 44 is cut into appropriate lengths for producing rolls of bath tissue. Alternatively, the extrudate can be L-shaped to be used as corner supports. It will be understood that the number of possible shapes is unlimited, depending only upon the desired end use of the sludge product.

Figure 5:
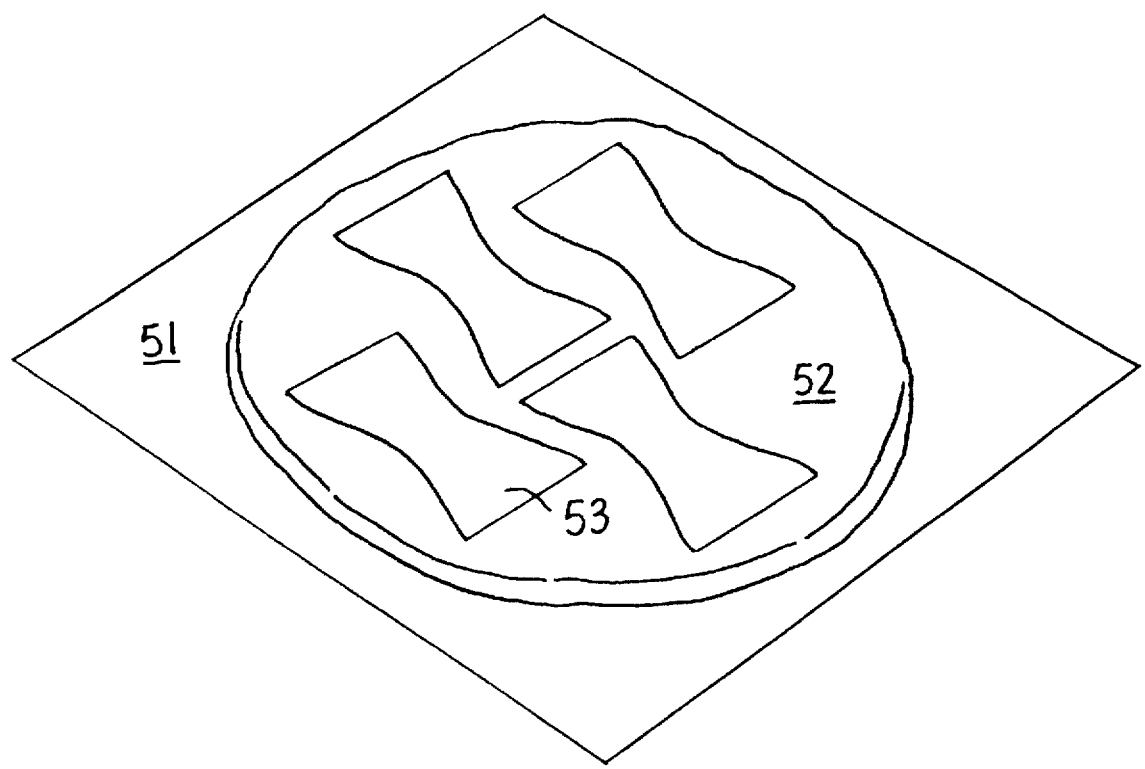
FIG. 5 is a schematic illustration of how the "dog bone" shaped sludge samples are prepared for tensile testing.
Figure 6:
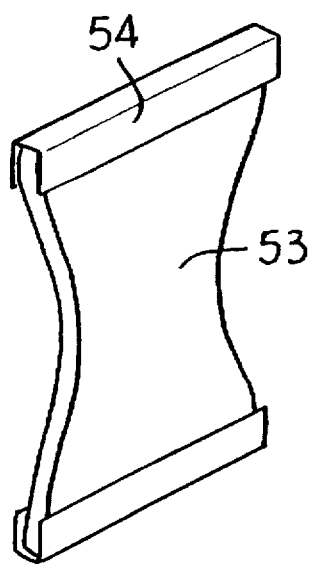
FIG. 6 is a further illustration of a single sample prepared for tensile testing.

FIG. 5 illustrates preparing "dog bone"-shaped samples of sludge materials for tensile testing. An amount of a sludge sample to be tested is placed between two sheets of polyethylene film 51. The sample is then rolled with a 22 pound brass rolling pin having a diameter of 125 millimeters and a width of 175 millimeters. The rolling is stopped when the flattened sample 52 has been reduced in thickness to about 0.060 inch. The top sheet of polyethylene is removed and dog bone shaped tensile test specimens 53 are cut out using a knife blade, similar to cutting out cookies from rolled dough. The length of the samples is about 60 millimeters. The maximum width (at the ends) of the samples is about 24 millimeters. The minimum width (at the center) is about 8.5 millimeters. Multiple tensile test samples can be cut from the sludge sample to provide meaningful average tensile values. A small piece of Saran® wrap 54 is placed over each end of the sample, as illustrated in FIG. 6, in order to prevent the sample from sticking to the testing machine clamps.

The sample specimens are tested at room temperature by placing them in the Model 2712-001 pneumatic grips of an Instron Model 55 tensile machine with a 500 Newton loadcell and a gage length of about 38 millimeters and a grip pressure of 15 psi. The specimen elongation rate is set at 10 millimeters per minute. The maximum stress and strain are measured at the instant failure occurs.

EXAMPLES

Example 1

An 18 gram sample of papermaking sludge containing 50 weight percent moisture and 45 weight percent inorganic solids (approximately equal amounts of Kaolin clay and calcium carbonate) was mixed with 3 weight percent of a polyacrylamide dispersant (Cynamer A-370, Cytec Industries). The mixture was kneaded by hand for about 5 minutes until the mixture was like modeling clay in texture and malleability. The material was then rolled into the shape of a hot dog by hand again as one would use modeling clay. The elongated piece was placed between two large sheets of plastic bag material about 5 mil thickness and rolled with a 43 pound brass rolling pin about 5 inches in diameter and about 6.5 inches wide. The mixture was easily rolled to a uniform thin thickness of about 0.005 inch. The top cover of plastic was carefully removed and the sheet left overnight to air dry. There was considerable curling and shrinkage to the sheet when dry. The surface of the sheet in contact with the plastic during drying had a very smooth feel while the air contact surface was more rough and bumpy. Both sides were easily written upon using a felt tip pen yielding very sharp edge lines. There was no bleeding of ink at the edge of the line that one experiences with paper made of recycled fiber or virgin fiber but using no clay or filler. A piece of the dried sheet was placed in a beaker of tap water and remained intact for over 5 days at room temperature in spite of periodic stirring with a spatula.

Example 2

Samples of the papermaking sludge were obtained from a deinking mill where paper to be recycled (mixed office waste) was processed to remove both ink and inorganic fillers and coatings to create a pulp fiber useful for making tissues. The solid waste stream coming from this mill (sludge) contained about 50% moisture. The inorganic portion of the sludge constituted about 55–60 percent of the solids and was a function of the feed stock coming into the mill. The inorganic portion of the sludge was approximately 50% clay commonly used for coating of papers (kaolin) and 50% filler commonly used for paper (calcium carbonate). The organic portion of the solids contained about 8% long fiber useful for papermaking. The balance of the organic portion was predominantly cellulosic fines (materials that can pass through a 200 mesh screen). The samples were taken from the deinking mill at the discharge of the conveyor that transports sludge from the screw press to the accumulation container. The samples were collected in clean 5 gallon buckets. The samples were refrigerated at 30° F. prior to use.

A smaller sample (about 500 grams) of the sludge was taken from the container of sludge and allowed to warm to room temperature (72° F.). The warmed sample was placed into the stainless steel bowl of a model K45SS Kitchenaid Mixer (4 quart) and mixed at the "stir" speed using the pastry dough agitator. 7.5 grams of polyacrylamide anionic dispersant (Cyanamer A-370 from Cyanamid Corp.) was added by sprinkling on the mixing sludge mass. This sprinkling was completed over approximately 20 seconds trying to keep the dispersant on the sludge and off of the bottom of the bowl. Adequate mixing was accomplished in approximately 5 minutes of agitation and could be observed as the mass of sludge changed from several small pieces and particles to a single clay like mass. The sludge changed from a crumbly, particulate mass to a moldable, clay like single mass.

A 20 gram sample of the sludge/dispersant mixture was briefly worked by hand into an approximate cylindrical shape (like a pencil) about 1.5 cm in diameter. This small sample was placed between 2 sheets of 5 mil high density polyethylene (HDPE) bag material. A 43 pound brass rolling pin (5 inch dia.×7 inch) was used to roll the sample into a thin sheet as shown in FIG. 1.

After rolling, the top sheet of HDPE was carefully removed to allow moisture to escape from the sludge sheet. The sheet was allowed to dry by evaporation into the room at ambient conditions (72° F. and 50 RH). This yielded a dry sheet of sludge paper but with considerable warpage.

A second sheet sample was dried by an alternate method using a steam-heated brass platen (Valley Laboratory Equipment by Voith Serial No. 119-434 & 77062) as illustrated in FIG. 2. This hot platen has a convex curvature of approximately 21.5 inch diameter which allows a canvas sheet to be applied over the vented side of the paper sheet which restrains it during drying and precludes warpage. Tension can be applied to the canvas at a level of from 4.75 to 18 pounds over a 9.8 inch width to create a restraining pressure of from approximately 0.045 psi to 0.17 psi. The temperature of the brass platen is set by a continuous flow of saturated steam at 3.5 psi which is approximately 215° F.

It will be appreciated that the foregoing description and examples, given for purposes of illustration, are not to be construed as limiting the scope of this invention, which is defined by the following claims and all equivalents thereto.

What is claimed is:

1. A method of modifying papermaking sludge comprising adding from about 0.5 to about 20 weight percent of a dispersant to the papermaking sludge and mixing the dispersant and the papermaking sludge until the rheology of the mixture is substantially the same as that of modeling clay.

2. The method of claim 1 wherein the amount of dispersant added to the papermaking sludge is from about 1 to about 12 weight percent.

3. The method of claim 1 wherein the amount of dispersant added to the papermaking sludge is from about 2 to about 8 weight percent.

4. The method of claim 1 wherein the dispersant is polyacrylamide.

5. The method of claim 1 wherein the dispersant is polycarboxylate.

6. The method of claim 1 wherein the dispersant is polysulfonate.

7. A method of making a paper sheet comprising: (a) combining papermaking sludge with a dispersant; (b) mixing the papermaking sludge and the dispersant; (c) forming the mixture of papermaking sludge and dispersant into a sheet; and (d) drying the sheet.

8. The method of claim 7 wherein the mixture of dispersant and papermaking sludge is formed into a sheet by extruding the mixture and rolling the extrudate into a flat sheet.

9. The method of claim 7 wherein the amount of dispersant combined with the papermaking sludge is from about 0.5 to about 20 weight percent.

10. The method of claim 7 wherein the dispersant is polyacrylamide.

11. A modified papermaking sludge composition comprising from about 5 to about 60 weight percent cellulose fibers and fiber fragments (fines), from about 10 to about 50 weight percent inorganic material, from about 0.5 to about 20 weight percent dispersant, and from about 30 to about 70 weight percent water.

12. The modified papermaking sludge of claim 11 wherein the inorganic material comprises calcium carbonate and clay.

13. The modified papermaking sludge of claim 11 wherein the dispersant is polyacrylamide.

14. The modified papermaking sludge of claim 11 wherein the amount of dispersant is from about 1 to about 12 weight percent.

15. The modified papermaking sludge of claim 11 wherein the amount of dispersant is from about 2 to about 8 weight percent.

16. A modified papermaking sludge comprising from about 0.5 to about 20 dry weight percent of a dispersant, said modified papermaking sludge having a tensile strength of about 5 kilopascals or greater.

17. The modified papermaking sludge of claim 16 wherein the tensile strength is about 10 kilopascals or greater.

18. The modified papermaking sludge of claim 16 wherein the tensile strength is from about 5 to about 70 kilopascals.

19. The modified papermaking sludge of claim 16 wherein the tensile strength is from about 10 to about 35 kilopascals.

20. A dry paper sheet comprising from about 5 to about 40 weight percent cellulose fibers and fiber fragments, from about 5 to about 30 weight percent clay, from about 5 to about 30 weight percent calcium carbonate and from about 1 to about 30 weight percent dispersant.

21. The paper sheet of claim 20 wherein the dispersant is polyacrylamide.

* * * * *